US009117193B2

(12) United States Patent
Brignull et al.

(10) Patent No.: US 9,117,193 B2
(45) Date of Patent: Aug. 25, 2015

(54) METHOD AND SYSTEM FOR DYNAMIC DETECTION OF AFFINITY BETWEEN VIRTUAL ENTITIES

(75) Inventors: Alfred J. Brignull, Essex Junction, VT (US); Michele P. Brignull, Essex Junction, VT (US); Rick A. Hamilton, II, Charlottesville, VA (US); Pamela A. Nesbitt, Tampa, FL (US); Anne R. Sand, Peyton, CO (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 12/554,097

(22) Filed: Sep. 4, 2009

(65) Prior Publication Data

US 2011/0060744 A1    Mar. 10, 2011

(51) Int. Cl.
*G06F 7/00* (2006.01)
*G06F 17/30* (2006.01)
*G06Q 10/10* (2012.01)
*G06Q 10/06* (2012.01)

(52) U.S. Cl.
CPC ............... *G06Q 10/10* (2013.01); *G06Q 10/06* (2013.01)

(58) Field of Classification Search
USPC ......................................... 707/E17.111, 748
See application file for complete search history.

(56) References Cited

U.S. PATENT DOCUMENTS

| | | | |
|---|---|---|---|
| 6,615,209 B1 * | 9/2003 | Gomes et al. ........................ 1/1 |
| 7,010,569 B2 | 3/2006 | Okayasu et al. |
| 7,036,082 B1 | 4/2006 | Dalrymple et al. |
| 2002/0042733 A1 * | 4/2002 | Lesandrini et al. ............. 705/10 |
| 2005/0132207 A1 * | 6/2005 | Mourad ........................ 713/189 |
| 2006/0010096 A1 * | 1/2006 | Crossland et al. ................ 707/1 |
| 2006/0059107 A1 * | 3/2006 | Elmore et al. .................. 705/64 |
| 2008/0140472 A1 * | 6/2008 | Gilat et al. ........................ 705/7 |
| 2008/0204450 A1 * | 8/2008 | Dawson et al. ............... 345/419 |
| 2009/0064103 A1 * | 3/2009 | Shih .............................. 717/113 |
| 2009/0220968 A1 * | 9/2009 | Issadore et al. .................. 435/6 |
| 2009/0234874 A1 * | 9/2009 | Sylvain ........................ 707/102 |
| 2009/0247282 A1 * | 10/2009 | Cheng ............................ 463/25 |
| 2010/0036718 A1 * | 2/2010 | Hamilton et al. ............ 705/14.4 |

FOREIGN PATENT DOCUMENTS

WO    WO 01/60072    8/2001

* cited by examiner

*Primary Examiner* — Alex Gofman
*Assistant Examiner* — Muluemebet Gurmu
(74) *Attorney, Agent, or Firm* — Whitham Curtis Christofferson & Cook, PC; Maeve McCarthy (57) ABSTRACT

A method and system are disclosed for detecting affinity between entities in a virtual universe (VU) using real time access to descriptions prepared from information about objective entities available in VU databases as well as descriptive information made available by the objective entities. Objective entities may be aggregations of virtual entities. Activators for affinity determinations are provided. The information on an objective entity is compared with descriptive information on a VU subject to determine affinity, and corresponding action of the VU subject. In this manner also the comparative affinities of different objective entities may determine actions of the VU subject.

19 Claims, 5 Drawing Sheets

METHOD AND SYSTEM FOR DYNAMIC DETECTION OF AFFINITY BETWEEN VIRTUAL ENTITIES

FIELD OF THE INVENTION

The present invention generally relates to the production and management of interactive virtual universes presented to users on computers linked by a network and, more particularly, to mechanisms for making interactions between virtual entities more lifelike.

BACKGROUND DESCRIPTION

Closely following the introduction of computer generated graphic representations of objects, computer games have been developed and have become popular to the point of becoming a significant industry. A significant factor in the continuing popularity of such games may possibly be the fact that the simulated venue or environment in which the game is played is limited only by the imagination of the game developer and can be presented to a viewer on a display with a realistic appearance which is limited only by the hardware and software employed to render associated images. Moreover, such simulated environments and the rules which govern them may be changed, and these changes may be executed dynamically.

Computers connected through networks such as the Internet have also allowed numerous participants to interact among themselves in the same game. As this multi-player game capability is synthesized with other Internet capabilities such as interactive chat rooms, advertising and marketing techniques, access to massive amounts of information, and the like, so-called virtual universes (sometimes referred to as "metaverses" or "3D Internet") have been developed and made available to the public in recent years. A virtual universe (VU) is a computer-based simulated environment intended for users thereof (referred to as "residents" or "agents") to inhabit, traverse and interact through the use of Avatars. An Avatar, in the context of a VU, is a graphical representation of a user. The appearance and movement of the Avatar is freely selectable and controllable by the user, and other participants can see the Avatar. The Avatar often takes the form of a cartoon-like human which can move through the regions of the virtual universe. These regions are generated in three dimensional (3D) landscapes and populated by 3D objects, including Avatars. The landscapes and objects shown in the virtual universe may or may not resemble the real world familiar to us, in terms of buildings and other constructed objects within the environment, geography, landscapes and the laws which govern the universe.

Some examples of virtual universes available to the public include Second Life® ("Second Life" is a trademark of Linden Research, Inc. in the United States and/or other countries). Entropia Universe™ ("Entropia Universe" is a trademark of Mindark PE AB in Sweden and/or other countries), and There® ("There" is a trademark of Forterra Systems, Inc. in the United States and/or other countries). Examples of massively multiplayer online games include EverQuest® ("EverQuest" is a trademark of Sony Online Entertainment, LLC in the United States and/or other countries), Ultima Online® ("Ultima Online" is a trademark of Electronic Arts, Inc. in the United States and/or other countries) or World of Warcraft World of Warcraft® ("World of Warcraft" is a trademark of Blizzard Entertainment, Inc. in the United States and/or other countries). Publicly available virtual universes and/or massively multiplayer online games are operated by persons or companies who provide servers to generate portions of the VU and which may impose a charge for participation as a resident, to establish a particular object or environment (sometimes referred to as an "island") within the VU, present advertising and the like or combinations thereof.

In short, an Avatar controlled by a resident can interact with other Avatars, objects and portions of the immediate environment of the Avatar in much the same way a person would interact with other persons, objects and portions of the environment in the real world and objects and local environments within the VU may be developed creatively to resemble the real world closely, not at all or with any degree of realism or fantasy in between. These combinations of virtual structures may be provided by the administrator of the VU or users of the VU, often for a not insubstantial fee.

Avatars in virtual worlds can have a wide range of business and social experiences, and such experiences are becoming more important as business and social transactions are becoming common in virtual worlds such as Second Life®. In fact, the characteristics of an Avatar play important social, business, and other related roles in these virtual worlds. Second Life® is a privately owned 3-D virtual world, made publicly available by Linden Research, Inc. The Second Life virtual world is computed and managed by a large array of servers that are owned and maintained by Linden Research, Inc. The Second Life client program provides its users (referred to as residents) with tools to view, navigate, and modify the Second Life®. world and participate in its virtual economy. Second Life has over 1 million residents. Social and business interactions are important in Second Life®, and these interactions include resident interactions in meetings both inside and outside of a commercial environment.

Furthermore, because of the computer implementation, transportation of an Avatar from one portion of the VU directly to another (a process referred to as "teleporting") may be nearly instantaneous, due allowance being made for latency between a movement decision and the rendering of that movement in the respective portions of the VU. This attribute of direct movement within a VU enables the resident to avoid both the time and expense of traversing the "space" between one VU portion and another, as would be necessary in a non-virtual environment. It should also be noted that rendering in a 3D environment is typically from the perspective of the Avatar of the user, and this perspective must be re-rendered when the user's Avatar moves or turns in a different direction within the same portion of the VU, or when any other Avatar or object within the user's field of view changes. Rendering can absorb considerable processing resources of the computer system on which the VU is implemented.

Virtual Worlds and Universes (terms used interchangeably here and summarized by the acronym "VU") present a tremendous new outlet for both structured and unstructured forms of virtual collaboration. Furthermore, the term "virtual" is not to be understood as distinct from the term "real world" but rather as a computer implemented set of structures and processes operable for monitoring and activating the structures and processes of the conventional "real world," and for serving as surrogate structures and processes that, in practical effect, extend the collaborative opportunities of the conventional "real world." A virtual world can be populated by Avatars, each of which is a virtual representation of the person controlling the Avatar, and where "real world" entities, including commercial and regulatory entities, can be represented by suitable structures and processes (including Avatars) controlled by these entities. Indeed, there is an emerging recognition that the structures and processes of virtual worlds may be used to enhance the structures and processes of the conventional "real world."

Life-like interaction with avatars and VU environments can be difficult. Verbal and text based information may be exchanged in a VU, yet meaningful communication is often sporadic and incomplete. One major inhibitor to effective avatar communication is the absence of real-time contextual clues (affinities) which enable detection of potential common interest and intent between avatars, and also between avatars and their VU environments. Accordingly, there exists a need in the art to overcome the foregoing deficiencies and limitations to life-like interaction.

SUMMARY OF THE INVENTION

It is therefore an object of the present invention to provide life-like interaction through the use of real time affinity detection.

This invention provides a mechanism to dynamically determine affinity between one avatar and another, or between an avatar and a VU environment or object. Such affinity correlation allows an avatar to very quickly determine whether there are other avatars, VU functions, or objects of interest in the immediate vicinity. For the purposes of the present application the term "objective entity" will be used to refer to an Avatar or a VU object or entity that is of interest to, and a focus of attention by, a subject. A subject having an "objective entity" of interest may be any VU object for which affinity determinations may be made, although such determinations most commonly will be made for an Avatar.

This invention dynamically creates or reads the character description of an avatar or a VU object. This description data is then used to evaluate the compatibility of an avatar with other user-defined characteristics. The affinity is then presented in an absolute or relative way to the user or object in the manner of its choosing. In this way, affinity groupings may be created, allowing potential interaction between avatars or other VU entities to be more meaningful. User-specified levels of affinity can be leveraged to allow more precise control over affinity groupings. The advantages of this method are:

Entity descriptions are prepared in real-time, so the description adapts as an avatar transitions within and/or traverses a VU (or across VUs);

It enables a more true-to-life experience in the VU by greatly enhancing communication choices via facilitating interaction with avatars and objects of similar social interest;

It can be applied to any entity within a VU, not just avatars, giving a "voice" to inanimate objects, communities, or corporations, e.g. obtain description of Corporation XYZ headquarters to discern characteristics of business culture and desired traits for new hires;

It provides additional market segmentation data for potential businesses and service providers;

It facilitates the dynamic matching of individuals with individuals, and individuals with products and services with a VU environment.

In order to accomplish these and other objects of the invention, a computer implemented method provides affinity data in a virtual universe by creating a description of a VU objective entity, generating an affinity measure of the objective entity from the description, and displaying the affinity measure to an owner of a VU subject. An aspect of this method is to create the description by gathering information about the VU objective entity from records maintained at a VU database, and accessing description information made available by the VU objective entity.

In a further aspect, the invention uses detection of an activator for providing the affinity data. That is, the affinity data may be provided in response to a specific request from an Avatar but also, more generally, on the basis of a VU event in the vicinity of an objective entity or subject. Thus, an "activator" (or "activating event") may be any detectable event from which it is logical to conclude, from rules provided for the VU, that affinity data is to be furnished. A specific request from an Avatar is such an activator that may be detected. For example, determining that the VU objective entity is within a vicinity of the VU subject may serve as an activator. Or an activator may be detected from a query by the VU subject, where the query contains criteria for identifying one or more VU objective entities and requests an affinity evaluation of the identified VU objective entities. Another activating event may consist of detecting a gesture by the VU objective entity, where the gesture indicates an interest by the VU objective entity in the VU subject.

Another aspect of the invention is to generate affinity measures by comparing the description of the VU objective entity with a description of the VU subject and compile a list of descriptive elements common to both the VU objective entity and the VU subject. Affinity measures may also be generated by searching the description of the VU objective entity for matches to each element of the description of the VU subject, and then compiling an affinity rating percentage where a number of matches found in the searching step is normalized as a percentage of searches undertaken. A variation on this technique is to treat the VU objective entity as an aggregate of all avatars within a remote area of the VU and create a composite description of the aggregate VU objective entity. To this may be added the step of teleporting the VU subject to the remote area if the affinity rating exceeds a threshold value.

Yet another aspect of the invention provides for a second VU objective entity, the first VU objective entity and the second VU objective entity each being inanimate objects representing a retail business, where the retail business meets criteria established by the VU subject, and where the VU subject is then teleported to the VU objective entity having the highest affinity measure.

In further aspects, the invention may be implemented as a system comprised of means for performing the above described steps, or as a computer program product having software modules for performing the steps. The techniques of the invention may also be provided as a service to customers of virtual universes.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
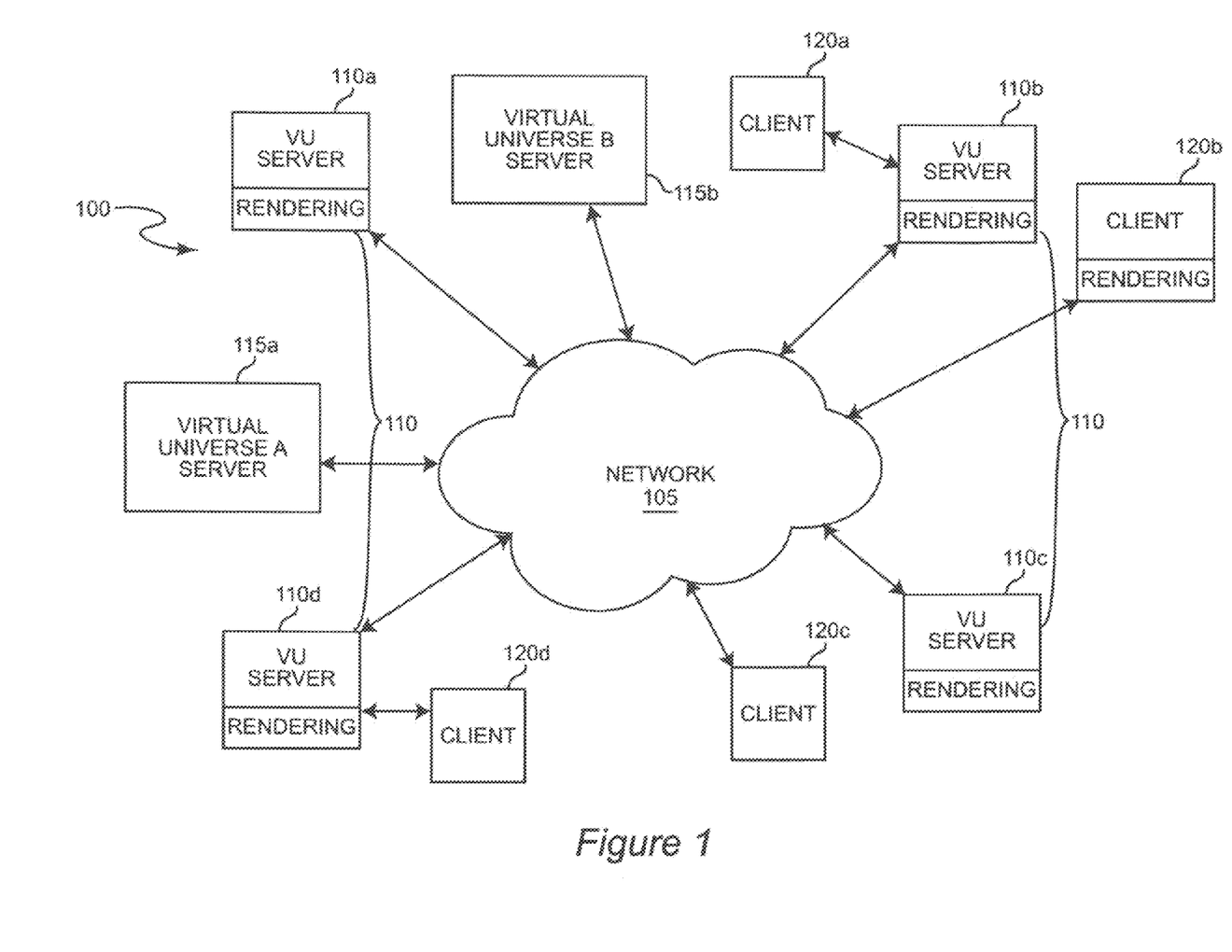
FIG. 1 is a high-level block diagram or data flow diagram of a network-based virtual universe.
Figure 2:
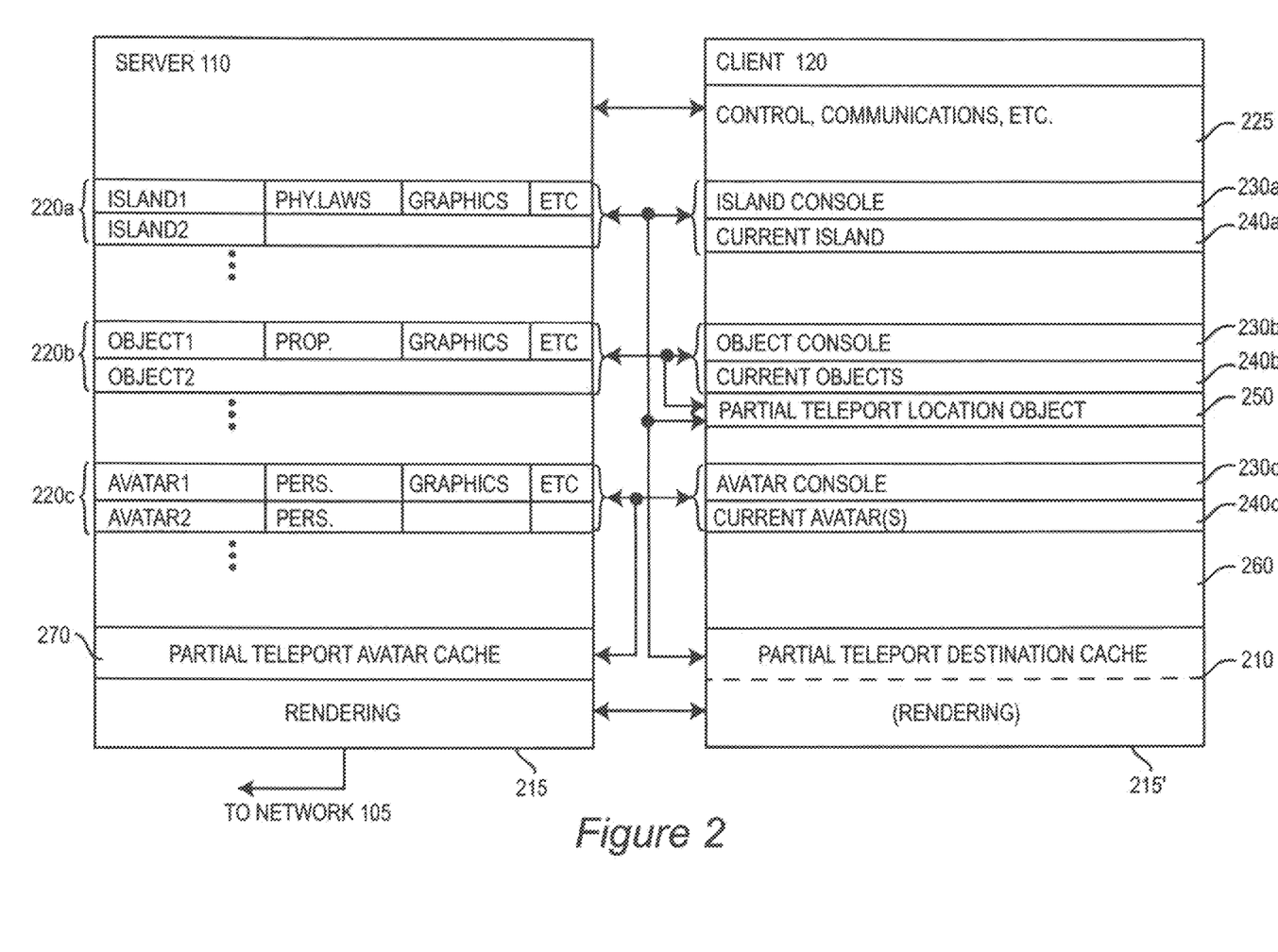
FIG. 2 is a similarly high-level block diagram of some details of the client 120 and server 110 generally provided for participation in a virtual universe.

Referring now to the drawings, and more particularly to FIG. 1, there is shown a high-level diagram of a network implementing a virtual universe (VU). FIG. 2 is a similarly high-level block diagram illustrating functional relationships between a client terminal and a server implementing a VU and between which network 105 may or may not be interposed. FIGS. 1-2 are principally arranged to facilitate an understanding of the overall general operation of a virtual universe and do not and are not intended to represent any particular known implementation of a VU. Further, at the level of abstraction with which a VU is represented in FIGS. 1 and 2, the VU illustrated may or may not include the invention and no portion of FIG. 1 or 2 is admitted to be prior art in regard to the invention. It should also be borne in mind that VU implementations have become relatively sophisticated and the underlying technology relatively mature such that enhancements thereto, such as those provided by the present invention, must be interoperable with existing network and VU infrastructures.

It should also be recognized that operation of a VU is extremely processing intensive and, while large amounts of computing resources may be accessible through a network, graphics generation and rendering must be distributed and managed in such a way as to provide images of portions of the VU in a very short period of time in order to be acceptable to residents of the VU, particularly in regard to updating views as Avatars are manipulated and as teleportation between islands of the VU occur. Further, substantial portions of the control of Avatars must be automated in order to keep the manipulation effort required of a resident within reasonable bounds while providing meaningful and reasonably logical and realistic interactions with environments, objects and other Avatars. Thus, each environment/island, object and Avatar must be individualized with attributes (e.g. behavioral traits, behavior characteristics, and other properties, including ownership and the like), and these attributes must be transmitted efficiently, generally as metadata, between potentially a large number of processors which perform the rendering thereof and the terminals through which residents interact with the VU and to which rendering is distributed in some form.

More specifically, as illustrated in FIG. 1, the overall network and system 100 will be recognized as substantially the same as that of the Internet. Other functional elements such as firewalls, proxies and the like may be included for purposes of security, reliability and the like but are not important to the successful practice of the invention. Network 105, such as the Internet, provides communications between all VU servers 110a-110d and at least one virtual universe server 115a,b which establishes the basic VU topology, characteristics, rules and the like and maintains membership and billing information in regard to residents (users). Clients 120a-120d are essentially user terminals and may communicate with the network 105 and virtual universe servers 115a,b either directly or through a VU server although that distinction, as well as the presence of functional elements mentioned above, is unimportant to the practice of the invention.

In the following discussion, the term "rendering" will be used to denote the entirety of processing performed on the definitions of landscapes, environmental features, avatars and/or objects as contained in metadata in order to produce signals which can be used to drive a display to produce a graphical image. Such processing will, for example, include projection of the location of an object in the virtual environment to a location in a two-dimensional representation from a particular viewing point, positioning and orienting geometric coordinates of graphic primitives approximating environment features, objects or avatars or parts thereof, making hidden line calculations, generating surface textures, generating lighting and shading effects and their interactions between objects and the like to construct a scene and, as such, constitutes a substantial processing burden.

As a practical matter in view of current communications bandwidth constraints, distribution of processing power and storage over a network, hardware and software compatibility and issues of data transmission delays and latency, some aspects of scenes are usually constructed at a server and transmitted over the network as positions, graphics primitives and geometric coordinates (sometime referred to as a preimage) while hidden line and surface computations, generation of textures, lighting and shading effects and the like for final image presentation (which are well-developed and routine processes that can be performed on relatively inexpensive hardware such as a graphics card) are generally performed on such hardware in a client processor. However, the location where the rendering process or portions thereof are performed is not important to the practice of the invention while the critical aspect of rendering for VU performance is the overall processing load the entire process imposes on a VU system, particularly when teleportation is performed.

Referring now also to FIG. 2, the nature of communications generally depicted in FIG. 1 will be explained in greater detail but also with a degree of generality since many variations thereof may be employed. It will be readily understood by those skilled in the art that rendering of islands, avatars, objects and the like is perhaps the most processing intensive aspect of a virtual universe as well as being the most time-critical for performance which is acceptable to the user. Hardware, software and firmware for performing a convenient portion of the rendering is generally resident in each VU server 110 and the virtual universe servers 115a,b of FIG. 1 but may be present to some degree (e.g. a graphics co-processor) at a client terminal 120a,b,c,d as depicted by dashed line 210 and parentheses in FIG. 2. In general, the servers 110, 115a,b will have the capability of arbitrating the most convenient/available location for the portion of the rendering performed on a server to be done most expeditiously. For example, when a rendering of a scene is required at, say, client 120a for interaction of a particular avatar with an object while changing location on an island, the rendering (including occlusion or hidden line processing) could be performed at the client, local server 110b or distributed over any or all of servers 110a-110d and possibly even including some client terminals (e.g. 120b) having rendering capability depending on rendering complexity (e.g. required image detail) and current processing loads of VU servers and clients. It should be appreciated that plural avatars for plural residents/users may be present in the same environment and that a different point of view may be required for the rendering presented to each resident/user.

Thus, the graphics to be presented to a user may be transmitted as a rendering or partial rendering to the network or a local client from a server (e.g. as primitives and geometric coordinates or even compressed graphics which may or may not be further modified at a local server or client processor) or, if rendering of avatars, objects or islands resident on a particular server are to be rendered on another processor, attributes such as the identity, physical laws, graphics definitions (e.g. primitives), etc. of an island, the identity, properties, graphics definitions, etc. of an object and/or behaviors, ratings, graphics definitions, etc. of an avatar are stored, preferably as metadata in servers 110 and transmitted as such to the processor which will actually perform the rendering and retransmission of the graphics. It should be appreciated that such attributes will be either constant or only infrequently or slowly changing and thus would be impractical and distracting to specify with each avatar command but can be automatically transmitted and retransmitted between servers, as needed, with avatar commands, controls and/or communications specified by the user/resident.

It should also be appreciated that clients 120*a,b,c,d* each will have appropriate controls and communications facilities (which are not generally hardware-dependent but can use available hardware interfaces such as a keyboard, mouse, camera, microphone or the like) collectively depicted at 225 of FIG. 2 which will preferably be resident on the client processor.

In order to create islands, objects and Avatars, some arrangement for doing so may also be resident on the client processor, preferably downloaded from virtual universe server 115 through the local server. The arrangement for this creation is preferably a graphical user interface (GUI), which may be in the form of one or more screens (possibly nested) functioning as a console 230*a*-230*c*. Such consoles allow particular attributes (e.g. locations, properties, behavioral patterns, graphics definitions and the like) to be specified and which are thereafter stored, preferably on an associated server 110 as depicted at 220*a*, 220*b* and 220*c* for islands, objects and avatars, respectively. After being specified they are then stored, preferably on an associated server 110 (e.g. 110*a*-110*d*). Similar GUIs 240*a*-240*c* are also provided (but preferably are resident on the client processor) for control of the current island, object and/or Avatar, once it has been created.

Suitable arrangements for providing GUIs or consoles 230*a*-230*c* and control GUIs 240*a*-240*c* are known and others providing enhanced user/resident convenience are foreseeable. The current island (220*a*) with its associated objects (220*b*) correspond to the current location of the current avatar (220*c*) and are thus the object of teleportation or relocation invitations to which the present invention is directed for management thereof. While the creation and control GUIs may be thought of as implemented through distinct and respective screens (or sets of nested screens), this structure is merely exemplary of a structure operable to provide a reasonable convenience and ease of use to the user. Those skilled in the art will appreciate that a user experienced with a particular VU may experience enhanced convenience and ease of use through a GUI that provides, for example, templates or other mechanisms that reduce or eliminate unnecessary or repetitive keystrokes or mouse clicks. For the purposes of clarity in describing the invention, however, the distinct functional screen set implementation described above in connection with FIG. 2 will be used.

Some definitions which will be helpful in the following discussion are:
1. Avatar—an avatar is a graphical representation the user/resident selects that others can see, often taking the form of a cartoon-like human but which can be produced with any degree of detail, whether real or fanciful;
2. Agent—an agent is the user's account, upon which the user/resident can build an avatar and which is tied to an inventory of assets the user creates and/or owns;
3. Region—a region is a virtual area of land (e.g. a portion of an island or an environment associated therewith, such as an interior space in a building) within the virtual universe which typically resides on a single server;
4. Landmarks—a landmark is a map location that can be saved by a user and typically comprises a name and a map coordinate within the VU;
5. Friend/contact—a friend or contact is another user/resident of the VU which is maintained in one or more lists which allows a user to see when friends or prior contacts are online and provides a mechanism for contacting them directly using tools available with the list.

It should also be appreciated that assets, avatars, the environment corresponding to a location and anything else visible in the virtual environment comprises Universally Unique IDentifiers (UUIDs) tied to geometric data (preferably distributed to users as textual coordinates), textures (preferably distributed to users as graphics files such as JPEG 2000 files) and effects data (preferably rendered by the user's client according to the user's preferences and the user's device capabilities, but could be otherwise rendered as discussed above).

Referring again to FIG. 2, it will be recalled from the foregoing that a client processor 120 through which a resident may participate in a VU will generally have information concerning a current avatar and a current environment as well as objects therein either stored or available from a server local thereto, as generally depicted at GUIs 240*a*-240*c*. Similarly a resident's inventory and attribute information, together with information generated by a user avatar while in the VU, will be similarly present or available. This information may include information including but not limited to resident preferences and characteristics, descriptive information, and any other information particular to the resident or particular to any avatar controlled by the resident. Comparable information for other users and avatars operating in the VU, and other objects present in the VU, will also be available. All this information may be assembled and analyzed in accordance with the procedures described hereafter in connection with FIGS. 3 and 4 to determine affinities between avatars or between an avatar and objects in the VU as described below. As will be appreciated by those skilled in the art, the processing required may be distributed between client and server. The information on the client 120 as well as the processing performed on the client 120 is represented by item 260. Similarly, the information on the server 110 as well as the processing performed on the server (or distributed to other servers in the VU) is collectively represented by item 270.

Data for the desired entity to be described is collected, analyzed, and then matched against user-defined criteria (or direct description to description comparison). Based on the results of the matching algorithm, affinities (i.e. descriptive elements that are held in common) are identified and reported. Such affinity descriptions may be offered as a service, may be implemented as a standard user selection for an avatar, (such as "touch" in Second Life), or may be automatically invoked when an activating event occurs (e.g. another avatar or object is within vicinity or speaks to you). Affinity may be measured in either Boolean, relative or absolute ways and can be used to narrow the range within which affinities may be acted upon. In principle, the overall affinity measure is a continuum that stretches from no similarities to an exact match on each of the individual affinities or descriptive elements that make up the overall measure. And, of course, the overall measure may combine the individual affinities according to any algorithm. For example, an element in such an algorithm may find "no match" if one avatar has a golden retriever and another has, instead, a cocker spaniel, or the algorithm may find a partial match by reasoning that both avatars have a dog. Such reasoning is dependent upon the content of the information available for affinity searches. Further, an affinity measure based on a particular collection of individual affinities may be altered by adding or subtracting particular individual affinities from the search. Queries could then include reference to affinity indices, and to particular values of these indices above or below which would indicate that further contact might be useful in specific areas.

Additionally, an activator for operation of an entity description service may be a query made by an avatar to find objects or other avatars having affinities within a desired range, based on specified criteria and an algorithm that combines the criteria. For example, one algorithm might be "a match on at least two of four specified affinities". Another algorithm might be a weighted combination of the four affinities into a normalized value represented as a percentage, where any value above a specified percentage meets the activation condition. A user may define a unique sorting algorithm to assemble and analyze available data to pinpoint the audience judged to be most receptive to a message.

A few sample queries may include:

Find a retail area having a preferred affinity by searching all retail stores in a specified and known Area1 of the current VU so as to identify and categorize key attributes to suggest similar locales in Area2 in another VU. For example, locate a "Jewelry District" in Area2 based on an affinity measure for the "Jewelry District" in Area1, or find the "counter culture neighborhood" in Area2 based on time spent in a similarly defined locale in Area1.

Find the closest affinity among all avatars currently in home decor department of a given retail store.

Find affinities among all avatars in a business meeting that are also from my company. For example, the objective may be for a variety of purposes aligned with my company (e.g. ensure follow-up discussion, ensure consistent and uniform message to external participants, review the message and its relevance for my company, plan for future actions/follow-up, and the like).

Find the closest affinity among all avatars who are currently within X distance of me.

Find the closest affinity among all avatars who are looking at me currently.

Find affinity of avatars whose body language shows interest in me (facing me, gesturing at me, speaking to me, beckoning, leaning toward me, etc. . . . ).

Find avatars in this group with the strongest affinity to me.

Find all objects in Area X that have an affinity rating greater than 70%.

This functionality may be enabled at all times (i.e. running in the background), or dynamically launched by an activating event such as a specific avatar gesture.

In a preferred embodiment, affinity determination would be activated by location. That is to say, when two VU entities are within a given vicinity of one another, an affinity check occurs. Such vicinity could be as narrow as within visual sight, or could encompass an entire VU. Additionally activation events would be programmable and may or may not vary based on entity type.

Available information for a specific avatar may be collected from:
  recent historical records;
  records of current interests;
  locations visited (e.g., islands or Vus);
  durations (e.g. length of time spent in a given area, at a given event, or participating in a given activity) and exposures (e.g. the type of or number of other avatars encountered, the type and number of other environments—businesses, buildings, islands, neighborhoods, and the like);
  events witnessed (e.g. business meetings, speeches, rallies, political gatherings, mass mobilizations, accidents, and the like);
  preferences and/or wish lists;
  friendships and alliances established;
  past and future (desired) purchases;
  VU experiences and activities (e.g. ride in hot air balloon, dance with another avatar, etc. . . . );
  goals (e.g. higher education, vocational training, learning to traverse an area, etc. . . . );
  existing description (entered in Entity Description Server). NOTE: multiple user-defined descriptions could exist for VU entities. Permission-based options could be used to invoke <a description?>.

Affinity Matching Methods

Many options are available for determining an affinity match between descriptions. Although any known or future matching method may be used, a few sample methods may include:
  text matching;
  context matching: associates closely related words, such as "car" and "auto";
  association matching: links words that are not contextually related, but that may still show an affinity, such as "golf" and "luxury car". The assumption is made that people that golf may also drive luxury cars;
  survey: user or object may have associated survey filled out with predefined categories;
  non-textual characteristics (e.g. experiences, behaviors, etc. . . . );

Affinity of Groups

Affinity may be determined between two entities, or among a group of entities. This invention would be useful to find the commonality among a group of avatars and/or objects.

User Scenario 1: Avatar to Avatar

1) Avatar-A enters their own user criteria/description into Entity Description Server, (this may simply be data entered when registering with the VU) For example:
  female—age 34;
  hobbies—hot air ballooning, rock climbing, guitar;
  interests—languages, raising golden retrievers;
  educational background—language major, fluent in 4 languages;
  favorite VU hang out—Extreme Disco;
  future plans—overseas assignment teaching English in emerging Asian countries.

2) Avatar-A automatically or manually launches the Description Service upon encountering Avatar-B (e.g. right clicks on "Description Service" option), initiating real-time evaluation and analysis of Avatar-B characteristics.

3) The Entity Description Server collects and analyzes Avatar-B data, and creates Avatar-B comparison description. Alternatively, Avatar-B may permit others to access his own descriptive information in the Entity Description Server, potentially eliminating the need for creating one from the collected data. A hybrid approach (i.e. combining user-defined and dynamically generated descriptive information) may also be used.

4) The Entity Description Server identifies and reports affinities between Avatar-A and Avatar-B (output of matching algorithm). For example: overseas work experience; golden retriever owner.

User Scenario 2: Avatar to Inanimate Object (or Inanimate Object to Avatar)

1) Avatar-A enters their own user criteria/description into Entity Description Server, (this may simply be data entered when registering with the VU) For example:
- female—age 34;
- hobbies—hot air ballooning, rock climbing, guitar;
- interests—languages, raising golden retrievers;
- educational background—language major, fluent in 4 languages;
- favorite VU hang out—Extreme Disco;
- future plans—overseas assignment teaching English in emerging Asian countries;
- health—hypertension concerns.

2) Avatar-A automatically or manually launches the Description Service upon encountering a VU object or environment, (in this example, a research lab) thus initiating real-time evaluation and analysis of said object or environment.

3) The Entity Description Server collects and analyzes Research Lab data, and creates Research Lab comparison description. Alternatively, the Research Lab may permit others to access its own descriptive information in the Entity Description Server, potentially eliminating the need for creating one from the collected data. A hybrid approach (i.e. combining user-defined and dynamically generated descriptive information) may also be used.

4) The Entity Description Server identifies and reports affinities of interest for Research Lab (output of matching algorithm). For example:
a) seeking female volunteers for clinical trials of new hypertension drug;
b) teleport to Hypertension Kiosk User Scenario 3: Inanimate Object to Inanimate Object This scenario would address the situation where a new object has been created in, or relocated to, a VU environment. As an example, a user may create a new slot-machine, or relocate an existing slot-machine to a VU casino. Association of object to object data may result in the slot-machine owner being notified that VU "region A" has the most slot-machine activity. Likewise, the user creating a VU kiosk addressing hypertension may be notified that a VU hospital exists at a particular coordinate and the kiosk may be more valuable collocated with the hospital.

User Scenario 4: Inanimate Object to Avatars

This scenario could be used by business or land owners in a VU to determine usage patterns and/or people to whom to market. For example, a segment of land in a VU (represented by creators, occupants, inhabitants, renters, deed owners, etc.) potentially housing a business could check avatar affinity with the land or associated objects (e.g. location, building or other structure at the location, the neighborhood or region or island that the land was in). What are the affinity attributes of avatars who had spent time near the land. This might determine whether someone wished to buy or sell the land or business. An ice cream shop might check to see how many avatars in the vicinity have an affinity for ice cream or sweets. The affinity with local merchants or inhabitants might determine new marketing strategies or activate a decision to relocate.

Figure 3:
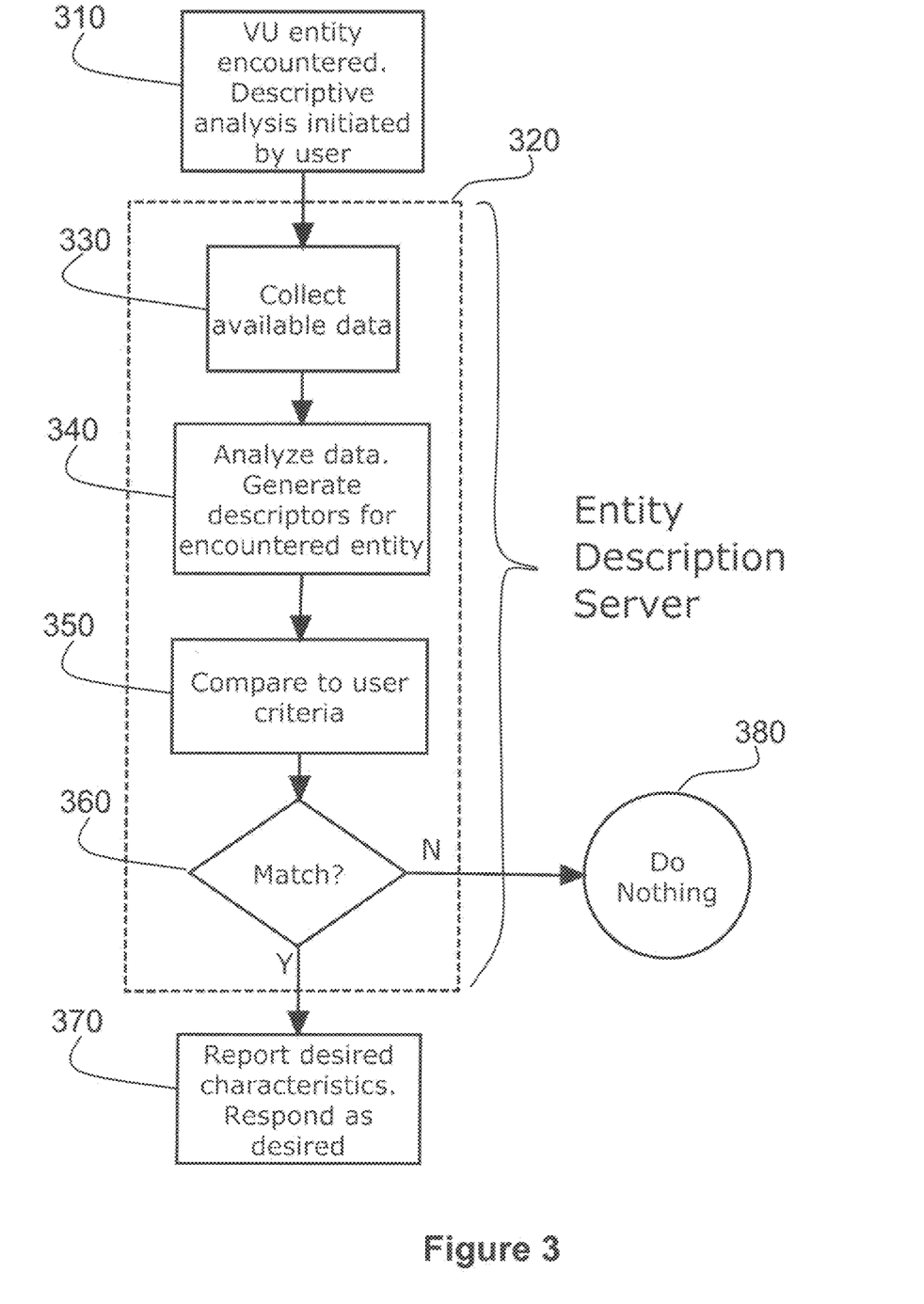
FIG. 3 is a flow chart showing how real-time affinity information is provided to an avatar.

Operation of the invention may be understood from FIG. 3. A VU user encounters a virtual entity (another avatar, an inanimate object, or a group) at 310 and launches Entity Description Server 320. Entity Description Server 320 collects 330 all available data, including permission based data. Then an algorithm derives affinity groups 340 by analyzing the available data and generating a description of the encountered entity (or entities, where the VU user desires a composite description). Another algorithm at the Entity Description Server 320 compares 350 affinity groups derived in the preceding step 340 to the pre-defined criteria or the description of the VU user. If there is a match 360 then the desired characteristics are reported 370 to the user, giving the user an opportunity to respond (e.g. speak, touch, enter a building) as desired. If there is no match the Entity Description Server 320 does nothing 380.

Figure 4:
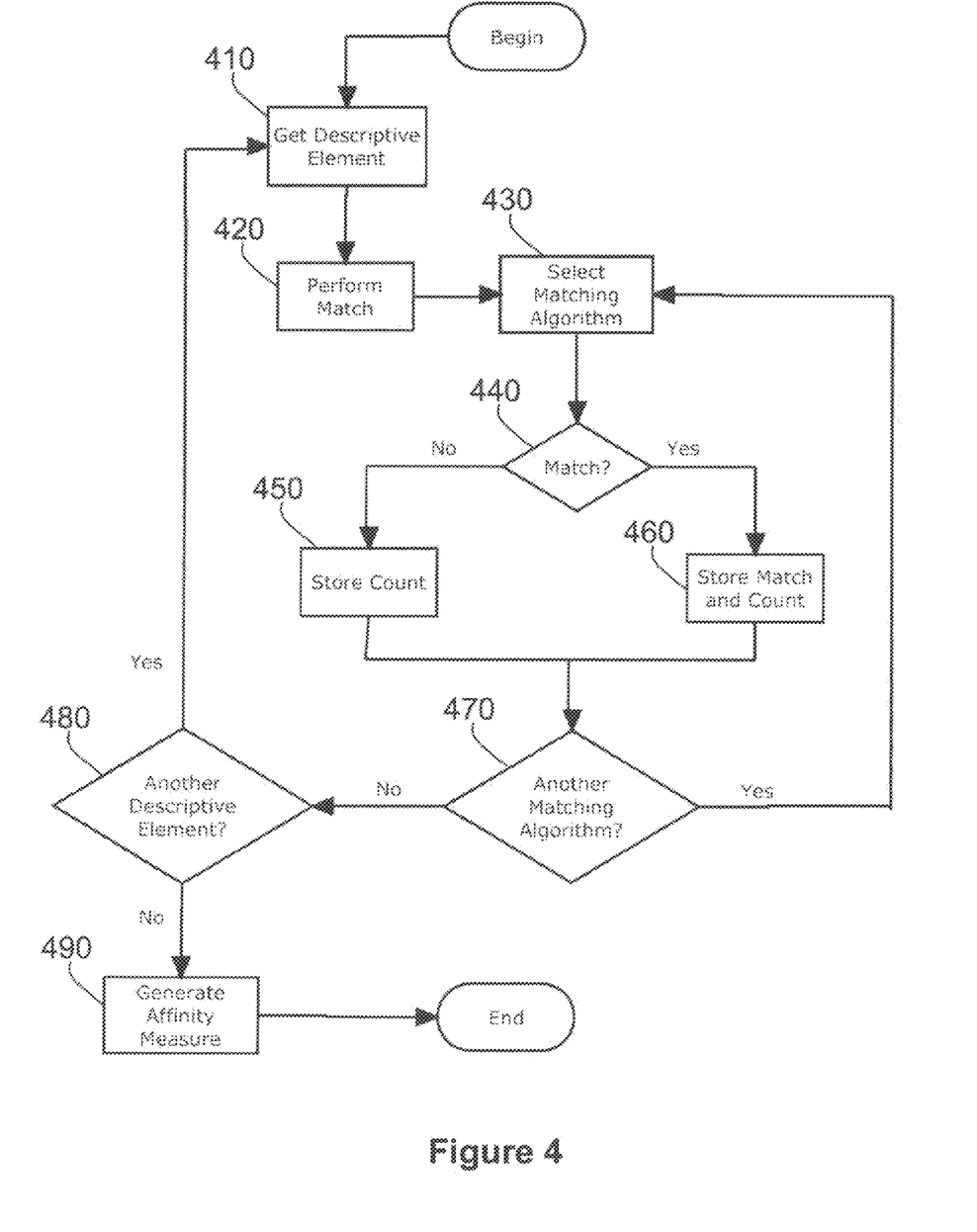
FIG. 4 is an exemplary flow chart showing how affinity measures may be constructed using descriptions of virtual entities.

As indicated above, there may be a variety of matching methods for the comparison 350. An exemplary protocol for using one or more of such algorithms to generate a measure of affinity with respect to the description of the VU user is shown in FIG. 4. For each element 410 of the VU user description a match is performed 420 by selecting an algorithm 430 and running the algorithm against the description of the encountered entity to determine a match 440. If there is a match 460 the match is stored. A count is also stored, providing a mechanism for weighing matches with respect to different types of descriptive elements. A count is also stored 450 if there is no match, so that a weighted affinity measure may be normalized and the affinity measures for different entities encountered by the VU user may be compared. If another matching algorithm 470 is to be applied to the same descriptive element, the process is repeated by selecting that algorithm 430. If no further matching algorithms are to be applied, and there is another descriptive element 480 to be matched, the process is repeated for each descriptive element 410.

When there are no further VU user descriptive elements to compare against the description of the encountered entity, the Entity Description Server 320 then generates an affinity measure 490. This may be as simple as a list of common affinities, which is then displayed to the VU user. Or the affinity measure may be a metric that is normalized by using the stored counts 450, 460 to produce, for example, a percentage metric. Such a metric might be applied against threshold levels established by the VU user, so that only for values of the metric above a certain level would the VU user be shown the details of match results. Further, the VU user may configure the Entity Description Server so that a particular subset of available matching algorithms is applied, and this subset may be varied by the VU user according to type of virtual entity encountered.

As can be discerned from the description of this invention, an Avatar's experience with a VU can be greatly enhanced by adding the functionality shown in FIGS. 3 and 4; that is, by a mechanism that provides real-time affinity information to such an avatar, rather than have the avatar wander and manually search for such affinities. Additionally, the dynamic nature of the disclosed affinity discovery and reporting also allows an Avatar to teleport from one location to another and to very rapidly determine whether people or objects of interest currently exist in that specific location.

While shown and described herein as a method and a system, it is understood that the invention further provides various alternative embodiments. For example, in one embodiment shown in FIG. 5, the invention provides a computer-readable/useable medium 22B that includes computer program code to enable a computer infrastructure to make interactions between virtual entities more lifelike. To this extent, the computer-readable/useable medium includes program code that implements each of the various process steps of the invention.

Figure 5:
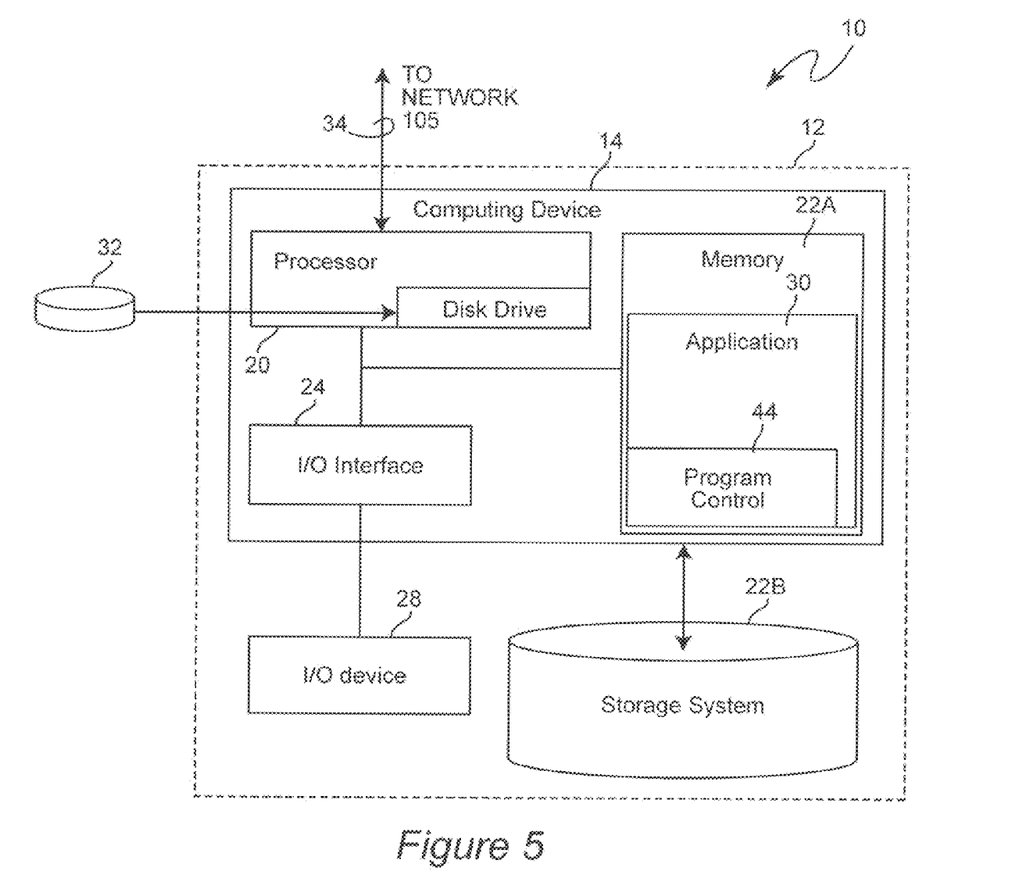
FIG. 5 illustrates a suitable processor architecture for use as a server or client in FIG. 1.

It is understood that the terms computer-readable medium or computer useable medium comprise one or more of any type of physical embodiment of the program code. In particular, the computer-readable/useable medium can comprise program code embodied on one or more portable storage articles of manufacture (e.g. a compact disc, a magnetic disk, a tape, etc., collectively depicted at 32), or on one or more data storage portions of a computing device, such as the memory 22A and/or the storage system 22B (e.g. a fixed disk, a read-only memory, a random access memory, a cache memory, etc.), and/or as a data signal 34 (e.g., a propagated signal) traveling over a network 105 as depicted in FIG. 1 (e.g., during a wired/wireless electronic distribution of the program code).

Further, computer infrastructure 10 is intended to demonstrate that some or all of the components of implementation could be deployed, managed, and serviced by a service provider who offers to implement, deploy, and/or perform the functions of the present invention for making interactions between virtual entities more lifelike, for example by licensing methods and browser or application server technology according to the present invention to an internet service providers (ISP) or cellular telephone provider. In one embodiment the invention may comprise a business method that performs the process steps of the invention on a subscription, advertising, and/or fee basis. Thus a service provider can create, maintain, support, etc., a computer infrastructure 12 including computing device 14, such as the computer infrastructure 10 that performs the process steps of the invention for making interactions between virtual entities more lifelike, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of an application 30 comprising a set of instructions including program control 44 intended to cause a computing device 20 having an information processing capability to perform a particular function either directly or after either or both of the following: (a) conversion to another language, code or notation: and/or (b) reproduction in a different material form. To this extent, program code can be embodied as one or more of: an application/software program, component software/a library of functions, an operating system, a basic I/O system/driver 24 for a particular computing and/or I/O device 28, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art, are intended to be included within the scope of the invention as defined by the accompanying claims.

While the invention has been described in terms of preferred embodiments, those skilled in the art will recognize that the invention can be practiced with modification within the spirit and scope of the appended claims.

What is claimed is:

1. A computer implemented method for providing affinity data in a virtual universe (VU), the computer performing the steps of:
    creating a first description of a VU objective entity, said first description comprising a plurality of descriptive elements, wherein said VU objective entity is a first inanimate object that is not an avatar;
    generating, from said first description, an affinity measure of the VU objective entity to a second inanimate object that is not an avatar, said second inanimate object having a second description comprising a further plurality of descriptive elements, said generating step including a comparison of said first description of said VU objective entity with said second description of said second inanimate object to find matches between said plurality of descriptive elements of said first description and said further plurality of descriptive elements of said second description;
    displaying the affinity measure to an owner of the second inanimate object, giving the owner an opportunity to determine a response as desired; and
    controlling operation of the second inanimate object based on the response by the owner of the second inanimate object to the displayed affinity measure in regard to the VU objective entity,
    wherein the affinity measure is a measure of similarity of descriptive elements and/or number of similar descriptive elements that are held in common by both the first description of the VU objective entity and the second description of the second inanimate object according to said matches found from said comparison, and
    wherein said displaying step displays said affinity measure as a compiled list of description elements which match for both the VU objective entity and the second inanimate object or as a metric describing an overall match between said plurality of descriptive elements of said first description and said further plurality of descriptive elements of said second description.

2. The method as recited in claim 1, wherein the description creation step further comprises a combination of the steps of:
    gathering information about the VU objective entity from records maintained at a VU database; and
    accessing description information made available by the VU objective entity.

3. The method as recited in claim 1, further comprising a step of:
    detecting an activator for providing the affinity data.

4. The method as recited in claim 3, wherein the step of detecting an activator comprises a further step of:
    determining that the VU objective entity is within a vicinity of the second inanimate object.

5. The method as recited in claim 3, wherein the step of detecting an activator comprises a further step of:
    detecting a query,
    wherein the query contains criteria for identifying one or more VU objective entities and requests an affinity evaluation of said identified VU objective entities.

6. The method as recited in claim 1, wherein said displaying step displays said affinity measure as said compiled list of description elements which match for both the VU objective entity and the second inanimate object, and wherein the generating step further comprises:
    compiling said compiled list of description elements which match for both the VU objective entity and the second inanimate object.

7. The method as recited in claim 1, wherein said displaying step displays said affinity measure as said metric describing the overall match between said plurality of descriptive elements of said first description and said further plurality of descriptive elements of said second description, wherein the metric an affinity rating percentage describing a number of matches found in the comparison normalized as a percentage of all descriptive element comparisons undertaken in said comparison.

8. The method as recited in claim 1, further comprising a step of:
    providing affinity data for a second VU objective entity, the first VU objective entity and the second VU objective entity each being an inanimate object representing a retail business, the retail business meeting criteria established by a VU subject, and further comprising a step of:
teleporting the VU subject to whichever of the first and second VU objective entities has a higher affinity measure.

9. A computer implemented system for providing affinity data in a virtual universe (VU), comprising:
means for creating a first description of a VU objective entity, said first description comprising a plurality of descriptive elements, wherein said VU objective entity is a first inanimate object that is not an avatar;
means for generating, from said first description, an affinity measure of the VU objective entity to a second inanimate object that is not an avatar, said second inanimate object having a second description comprising a further plurality of descriptive elements, said means for generating including a comparison of said first description of said VU objective entity with said second description of said second inanimate object to find matches between said plurality of descriptive elements of said first description and said further plurality of descriptive elements of said second description;
means for displaying the affinity measure to an owner of the second inanimate object, giving the owner an opportunity to determine a response as desired; and
means for controlling operation of the second inanimate object based on the response by the owner of the second inanimate object to the displayed affinity measure in regard to the VU objective entity,
wherein the affinity measure is a measure of similarity of descriptive elements and/or number of similar descriptive elements that are held in common by both the first description of the VU objective entity and the second description of the second inanimate object according to said matches found from said comparison, and
wherein said means for displaying displays said affinity measure as a compiled list of description elements which match for both the VU objective entity and the second inanimate object or as a metric describing an overall match between said plurality of descriptive elements of said first description and said further plurality of descriptive elements of said second description.

10. The system as recited in claim 9, wherein the description creation means further comprises:
means for gathering information about the VU objective entity from records maintained at a VU database; and
means for accessing description information made available by the VU objective entity.

11. The system as recited in claim 9, further comprising means for detecting an activator for providing the affinity data.

12. The system as recited in claim 11, wherein the means for detecting an activator comprises a means for determining that the VU objective entity is within a vicinity of the second inanimate object.

13. The system as recited in claim 11, wherein the means for detecting an activator comprises a means for detecting a query, wherein the query contains criteria for identifying one or more VU objective entities and requests an affinity evaluation of said identified VU objective entities.

14. A computer program product for providing affinity data in a virtual universe (VU), comprising:
a non-transitory computer readable medium storing signals for causing a digital data processor to perform the steps of:
creating a first description of a VU objective entity, said first description comprising a plurality of descriptive elements, wherein said VU objective entity is a first inanimate object that is not an avatar;
generating, from said first description, an affinity measure of the objective entity to a second inanimate object that is not an avatar, said second inanimate object having a second description comprising a further plurality of descriptive elements, said generating step including a comparison of said first description of said VU objective entity with said second description of said second inanimate object to find matches between said plurality of descriptive elements of said first description and said further plurality of descriptive elements of said second description;
displaying the affinity measure to an owner of the second inanimate object, giving the owner an opportunity to determine a response as desired; and
controlling operation of the second inanimate object based on the response by the owner of the second inanimate object VU subject to the displayed affinity measure in regard to the VU objective entity,
wherein the affinity measure is a measure of similarity of descriptive elements and/or number of similar descriptive elements that are held in common by both the first description of the VU objective entity and the second description of the second inanimate object according to said matches found from said comparison, and
wherein said displaying step displays said affinity measure as a compiled list of description elements which match for both the VU objective entity and the second inanimate object or as a metric describing an overall match between said plurality of descriptive elements of said first description and said further plurality of descriptive elements of said second description.

15. The computer program product as recited in claim 14, wherein the description creation step further comprises a combination of the steps of:
gathering information about the VU objective entity from records maintained at a VU database; and
accessing description information made available by the VU objective entity.

16. The computer program product as recited in claim 14, further comprising the step of:
detecting an activator for providing the affinity data.

17. Implementing a service for providing affinity data in a virtual universe (VU), comprising the method of:
gathering information about a VU objective entity from records maintained at a VU database, wherein said VU objective entity is a first inanimate object that is not an avatar;
accessing description information made available by the VU objective entity, said description information comprising a plurality of descriptive elements;
generating an affinity measure of the VU objective entity to a second inanimate object from the information in the VU database and the description information made available by the VU objective entity, said second inanimate object having a second description comprising a further plurality of descriptive elements, said generating step including a comparison of said first description of said VU objective entity with said second description of said second inanimate object to find matches between said plurality of descriptive elements of said first description and said further plurality of descriptive elements of said second description;

displaying the affinity measure to an owner of the second inanimate object, giving the owner an opportunity to determine a response as desired; and controlling operation of the second inanimate object based on the response by the owner of the second inanimate object to the displayed affinity measure in regard to the VU objective entity, wherein the affinity measure is a measure of similarity of descriptive elements and/or number of similar descriptive elements that are held in common by both the first description of and information about the VU objective entity and the second description of the second inanimate object according to said matches found from said comparison, and wherein said displaying step displays said affinity measure as a compiled list of description elements which match for both the VU objective entity and the second inanimate object or as a metric describing an overall match between said plurality of descriptive elements of said first description and said further plurality of descriptive elements of said second description.

18. The method of implementing a service as recited in claim 17, wherein said displaying step displays said affinity measure as said compiled list of description elements which match for both the VU objective entity and the second inanimate object, and wherein the affinity measure generation step further comprises:

compiling said compiled list of description elements which match for both the VU objective entity and the second inanimate object.

19. A method for implementing a virtual universe system capable of providing affinity data to a user on a plurality of network-connected computers, said method comprising steps of means for creating a first description of a VU objective entity, said description comprising a plurality of descriptive elements, wherein said VU objective entity is a first inanimate object that is not an avatar;

configuring at least one of said plurality of network-connected computers to provide means for generating, from said first description, an affinity measure of the VU objective entity to a second inanimate object that is not an avatar, said second inanimate object having a second description comprising a further plurality of descriptive elements, said means for generating including a comparison of said first description of said VU objective entity with said second description of said second inanimate object to find matches between said plurality of descriptive elements of said first description and said further plurality of descriptive elements of said second description;

configuring at least one of said plurality of network-connected computers to provide means for displaying the affinity measure to an owner of the second inanimate object, giving the owner an opportunity to determine a response as desired; and configuring at least one of said plurality of network-connected computers to provide means for controlling operation of the second inanimate object based on the response by the owner of the second inanimate object to the displayed affinity measure in regard to the VU objective entity, wherein the affinity measure is a measure of similarity of descriptive elements and/or number of similar descriptive elements that are held in common by both the first description of the VU objective entity and the second description of the second inanimate object according to said matches found from said comparison, and wherein said means for displaying displays said affinity measure as a compiled list of description elements which match for both the VU objective entity and the second inanimate object or as a metric describing an overall match between said plurality of descriptive elements of said first description and said further plurality of descriptive elements of said second description.

* * * * *